United States Patent [19]
Chang

[11] Patent Number: 6,118,910
[45] Date of Patent: Sep. 12, 2000

[54] METHOD OF ALIGNING OPTICAL FIBERS TO A MULTI-PORT OPTICAL ASSEMBLY

[75] Inventor: Kok Wai Chang, Sunnyvale, Calif.

[73] Assignee: Agilent Technologies, Inc., Palo Alto, Calif.

[21] Appl. No.: 09/081,877

[22] Filed: May 19, 1998

[51] Int. Cl.[7] .................................................... C02B 6/26
[52] U.S. Cl. .............................. 385/16; 385/33; 385/43; 385/22; 385/11; 385/83
[58] Field of Search .................................. 385/11, 33, 24, 385/16, 83, 20, 21, 43, 22; 359/484, 483, 494, 495, 496, 497

[56] References Cited

U.S. PATENT DOCUMENTS

| | | | |
|---|---|---|---|
| 4,236,783 | 12/1980 | Hapner et al. | 350/96.13 |
| 4,989,941 | 2/1991 | Soref | 385/33 |
| 5,278,929 | 1/1994 | Tanisawa et al. | 385/93 |
| 5,305,136 | 4/1994 | Smith | 359/247 |
| 5,381,250 | 1/1995 | Meadows | 359/39 |
| 5,574,596 | 11/1996 | Cheng | 359/484 |
| 5,740,288 | 4/1998 | Pan | 385/11 |

*Primary Examiner*—Hung N. Ngo

[57] ABSTRACT

A method of assembling an optical device for coupling optical fibers to a corresponding number of input/output ports of a stack of optical elements includes utilizing at least one controllable multi-state optical element to selectively switch the optical coupling among the ports. The controllable multi-state element is one element within a stack of polarization-manipulating elements having a configuration that allows the condition of the multi-state element or elements to dictate the optical coupling among the ports. In the preferred embodiment, the multi-state element is a Faraday rotator. The method may be used in either or both of a quality control application or a fiber-to-port alignment application. In the quality control operation, the stack of polarization-manipulating elements is tested to verify proper operation with respect to separating and selectively recombining polarization components of input beams. In the fiber-to-port alignment application, the fibers on the same side of the stack are first fixed in a parallel relationship with a known center-to-center distance that is equal to the center-to-center distance between corresponding ports of the stack. By optically aligning one of the fibers on the forward side of the stack with the fibers on the rearward side of the stack, at least one other fiber is automatically brought into registration with its corresponding port.

17 Claims, 8 Drawing Sheets

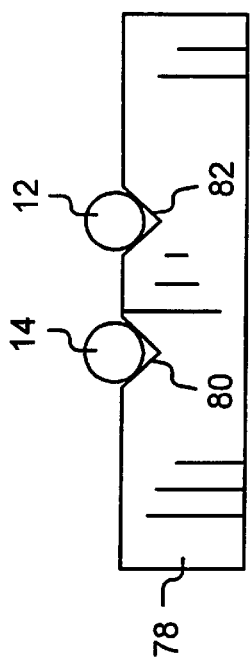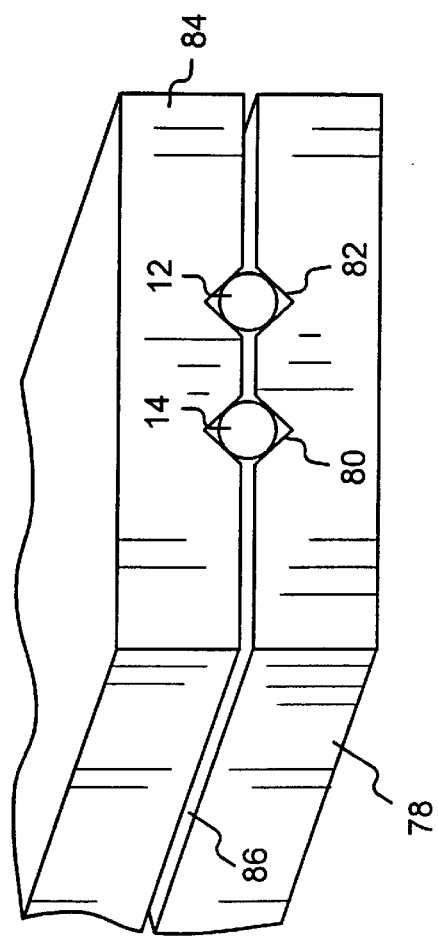

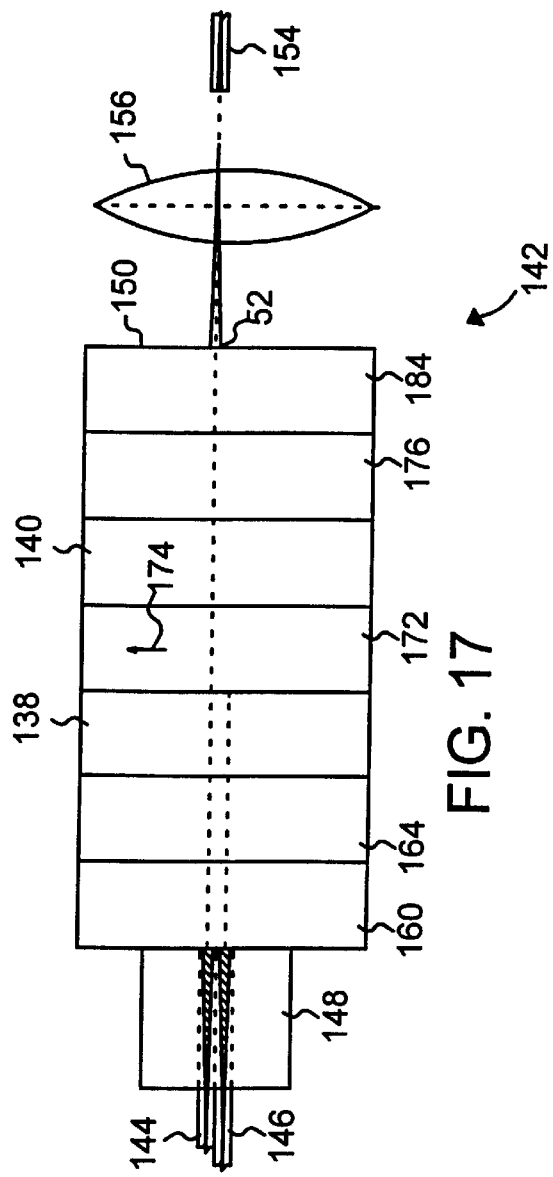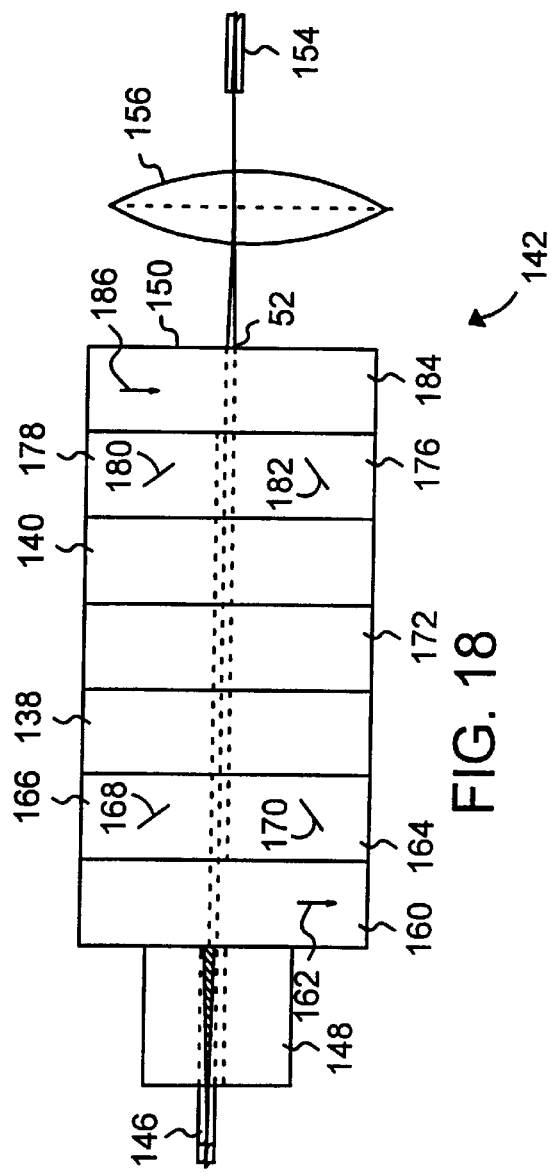

METHOD OF ALIGNING OPTICAL FIBERS TO A MULTI-PORT OPTICAL ASSEMBLY

TECHNICAL FIELD

The invention relates generally to optical assemblies for manipulating polarization components of propagating light and more particularly to methods of aligning optical fibers to a stack of optical elements.

BACKGROUND ART

The flexibility and reliability of communication networks based upon transmissions of light signals via optical fibers have been significantly increased by the availability of assemblies such as optical circulators and isolators. For example, a three-port circulator may be used to enable a single fiber to be used for bidirectional communications between two remote sites. By utilizing non-reciprocal optical elements, i.e. elements which affect light moving in different directions differently, a bidirectional fiber may be optically coupled to both an input fiber and an output fiber. Non-reciprocal operations provide differences in polarization rotation and in "walk-off," i.e. spatial displacement, of oppositely directed light beams, so that the input and output fibers are selectively coupled or isolated from each other.

An input fiber of an optical isolator directs light signals into an optical assembly that splits the light into polarization components, performs non-reciprocal operations on the components, and recombines the components for output at an output fiber. The non-reciprocal operations are designed to reduce the likelihood that back-directed light will be aligned with the input fiber.

Systems that include optical circulators or isolators often have two or more fibers in a parallel relationship at a forward end of an assembly of optical elements that manipulate the polarization components of beams propagating through the assembly to or from one of the parallel fibers. At a rearward end of the assembly is at least one fiber that is aligned to be optically coupled to first and second fibers at the forward end, with the optical coupling being limited to receiving signals from the first fiber and transmitting signals to the second fiber. Such an assembly is described in U.S. Pat. No. 5,574,596 to Cheng. The optical circulator of Cheng includes two birefringent crystal endplates, two non-reciprocal Faraday rotators inserted between the birefringent crystal endplates, and a pair of matched birefringent crystal plates positioned between the two Faraday rotators. The first birefringent endplate divides an input beam traveling forwardly from a first port into two polarization components. The adjacent non-reciprocal Faraday rotator properly aligns the polarization components for lateral displacement (i.e., walk-off) by the center birefringent crystal plates. The polarization components are again rotated at the second Faraday rotator. The second birefringent crystal endplate then combines the two polarization components for output from a second port at the rearward end of the optical circulator. Since the assembly is operationally symmetrical from a center plane perpendicular to the direction of light propagation, the operations will be the same regardless of the direction of light input into the assembly. However, since some of the operations on the polarization components are non-reciprocal, the forward and rearward paths from and to the second port will not be coincident. Instead, rearwardly directed light from the second port will exit from a third port at the forward end of the assembly.

The fabrication requirements for manufacturing an optical circulator or isolator include precisely locating the optical fibers in order to achieve the selective coupling with minimal signal loss. The alignment is performed actively and is often time-intensive, since both the spatial and rotational locations of the different fibers are critical. Specifically designed alignment tools may include a jig to secure the assembly of optical elements and a video system for detecting light output from one of the fibers in response to light input from a different fiber. For example, the procedure for aligning fibers to a three-port circulator may include aligning optical fibers to the first and second ports on the opposite sides of the circulator and then repeating the alignment process to optically couple the fiber at the second port to another fiber at the third port. Each of the two alignment steps must be executed for every three-port circulator of a manufacturing yield. There are often hundreds of circulators in a yield. Thus, the expense of the alignment procedure is a significant factor in determining the overall cost of a circulator or isolator. The importance of this factor increases proportionally with the number of fibers that must be aligned to the circulator or isolator.

What is needed is a method of assembling an optical device, such as a circulator or isolator, such that the number of alignment steps is reduced without jeopardizing the accuracy of fiber-to-fiber alignments.

SUMMARY OF THE INVENTION

A method of assembling an optical device for selectively coupling optical signals among at least three input/output ports includes utilizing at least one controllable multi-state optical element to switch between optically coupling a first and second port and optically coupling the second port and a third port. The controllable multi-state element is one element within a stack of polarization-manipulating elements having a symmetry that allows the condition of the multi-state element or elements to dictate the optical coupling among the three or more ports. In the preferred embodiment, the multi-state element is a Faraday rotator that provides rotational manipulation of the polarization components of an input beam in a manner that is dependent upon an applied magnetic field. The stack of polarization-manipulating elements further includes walk-off crystals that spatially displace polarization components depending upon the rotational orientation of the polarization components. Therefore, the selection of the state of the magnetic field applied to the Faraday rotator may be used to determine which polarization component of a beam is oriented for spatial displacement by a particular walk-off crystal.

The method may be used in either or both of a quality control application and a fiber-to-port alignment application. In the quality control application, the stack of polarization-manipulating optical elements is tested. Often, the individual elements are fabricated in batches and are then used to assemble element stacks of hundreds of optical isolators or circulators. Selected element stacks within a manufacturing yield may be quality-control tested to verify the proper performance of the operations of separating and selectively recombining polarization components of input beams. In this application, a light source is positioned at either the forward or the rearward side of a stack to be tested. A light detector is positioned at the opposite side. The multi-state optical element within the stack is switched to determine whether there is optical coupling between the first and second ports in the first state and to determine whether there is optical coupling between the second and third ports in the second state.

In one embodiment, the light source is directed at the first port and the light detector is an element of a video system that verifies that the polarization components are recombined at the second port when the multi-state element is in the first state and are isolated when the multi-state element is in the second state. The light source is then switched to the third port in order to verify that there is optical coupling to the second port when the multi-state element is in the second state, but there is optical isolation when the multi-state element is in the first state. In another embodiment, the light source is directed at the second port and the video system is positioned to verify that an input beam is switched between recombining at the first port and recombining at the third port when the multi-state element is switched between the first and second states.

If it is determined that the axes of recombined polarization components are not coincident with the axis of a port at which the components are to be output, the method may include a step of structurally changing the stack. For example, the axes of polarization components and a port may be properly aligned by substituting one walk-off crystal with a walk-off crystal having an increased or reduced thickness. On the other hand, if the two axes of the polarization components are aligned with each other, but misaligned with the anticipated location of the desired port, adjustments may be made in subsequent steps of the assembly process. For example, if the actual center-to-center distance between the first and third ports is greater than the anticipated distance, a fiber-seating assembly may be modified to compensate for the difference. This compensation would be specific to a manufacturing yield.

In the fiber-to-port alignment application of the method, fibers that are to be aligned with ports on the same side of the stack are first fixed in place relative to each other. For example, in a three-port circulator, the first and third fibers are fixed in a parallel relationship with a center-to-center distance equal to the center-to-center distance between the first and third ports of the stack of optical elements. In the preferred embodiment, adjacent fibers are precisely fixed in position relative to each other by photolithographically forming parallel grooves in a substrate, such as a semiconductor substrate, and seating the fibers within the grooves. Photolithography or other integrated circuit fabrication techniques may be used to ensure that the vertical and horizontal positions of one fiber are precisely known on the basis of determining the position of another fiber. In the alignment process, one of the fibers may be used as a reference fiber.

An array of side-by-side optical elements that include walk-off crystals and a Faraday rotator is formed and tested to verify that switching the magnetic field applied to the Faraday rotator switches the low loss port-to-port optical coupling of the array. After such verification, known alignment procedures may be used to align a reference fiber on one side of the array of optical elements with a reference fiber on the opposite side of the array. The alignment of the non-reference fibers is automatically achieved, since the fibers are precisely located relative to each other at a pitch that equals the pitch of the ports. Again referring to the example of the three-port circulator, by optically coupling the first fiber on a forward side of an array to a second fiber on the rearward side, the third fiber is brought into registration with the third port of the array.

An advantage of the invention is that the number of alignment steps may be significantly reduced. There is a significant cost to each fiber-to-port alignment. By providing a method in which at least one fiber is automatically aligned with its associated port, the cost of manufacturing a fully assembly optical circulator or isolator is substantially reduced.

BRIEF DESCRIPTION OF THE DRAWINGS

FIG. 4 is an end view of a fiber-seating assembly of FIG. 1.

FIG. 5 is a perspective view of the fiber-seating assembly of FIG. 4.

FIG. 17 is a top view of a second optical device that accommodates verification and alignment procedures in accordance with the invention.

FIG. 18 is a side view of the optical device of FIG. 17.

DETAILED DESCRIPTION

Figure 1:
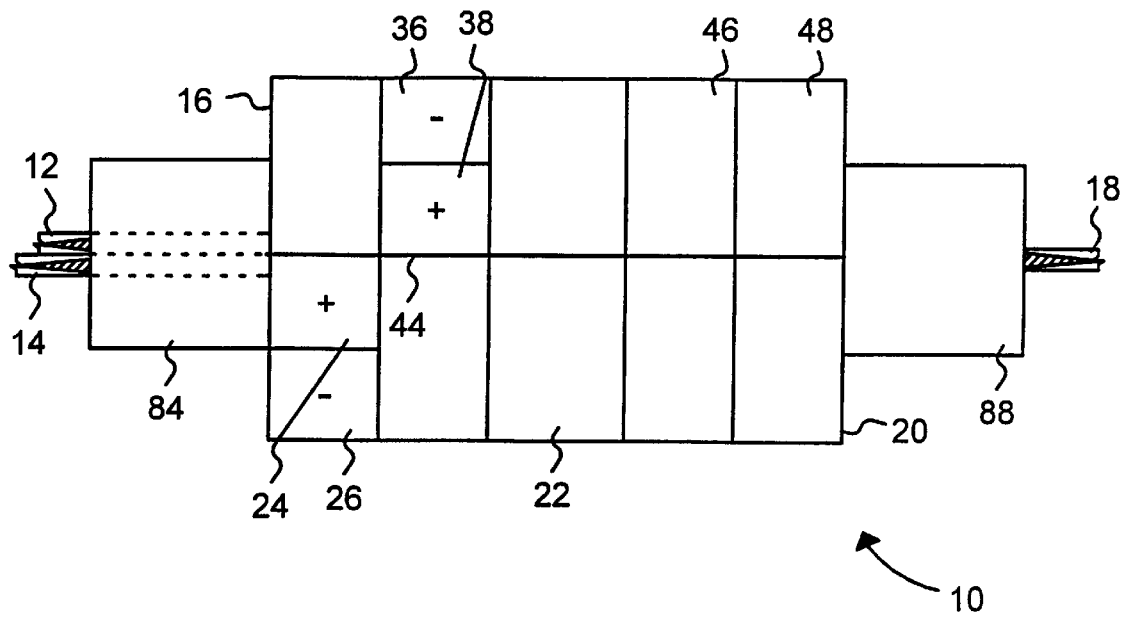
FIG. 1 is a top view of an optical device assembled in accordance with the invention.

With reference to FIG. 1, an optical circulator 10 is shown as including first and third optical fibers 12 and 14 at a forward side 16 of a stack of optical elements. The circulator includes a second optical fiber 18 at a rearward side 20 of the element stack. In the embodiment of FIG. 1, the fibers 12, 14 and 18 are thermally expanded core (TEC) fibers, but this is not critical. Optical fibers having a uniformly dimensioned core may be utilized in the assembly procedure to be described below. A "fiber" is defined herein as a waveguide that is used to input and/or output optical signals to and from the circulator or another optical device. The fibers may be photolithographically fabricated regions of silicon dioxide having dopant to efficiently conduct an optical signal into and out of the circulator.

The optical circulator 10 may be used as a three-port circulator in which the second fiber 18 functions as an output for signals introduced from the first fiber 12, but functions as an input fiber for signals that are to be output via the third fiber 14. However, the optical coupling among the fibers may be switched by changing the state of a multi-state element 22 at the center of the circulator. In the preferred embodiment, the multi-state element is a Faraday rotator. As is known in the art, the properties of the Faraday rotator with respect to rotating polarization components can be varied by changing the magnetic field applied to the Faraday rotator. The rotator may be formed of an yttrium-iron garnet (YIG) crystal, but other materials which are controllable with respect to rotating polarization components may be substituted. While not shown in FIG. 1, the magnetic field may be applied by means of a permanent magnet. At least with respect to the assembly procedure, the permanent magnet should be manipulable, allowing the poles of the applied magnetic field to be reversed as desired. Alternatively, the magnetic field may be applied by means of conducting current through a coil surrounding the Faraday rotator 22. In this embodiment, the direction of current flow determines the rotation of polarization components propagating through the Faraday rotator.

Figure 2:
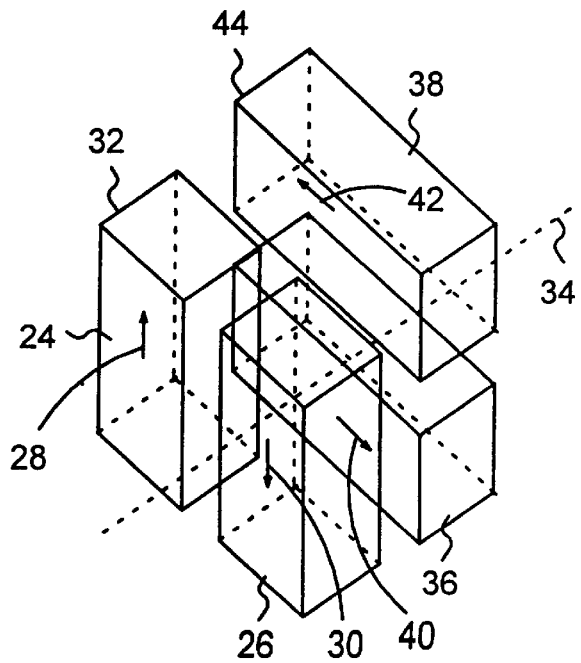
FIG. 2 is an exploded isometric view of two walk-off crystal pairs within the optical device of FIG. 1.

At the forward side 16 of the stack of optical elements that form the circulator 10 is a first pair of walk-off crystals 24 and 26 with opposed walk-off directions. The opposed walk-off directions are indicated by arrows 28 and 30 in FIG. 2 and by the "+" and "−" signs in FIG. 1. In the top view of FIG. 1, the edge 32 of the walk-off crystal 28 is aligned with the axis of the element stack. This axis is indicated by dashed line 34 in FIG. 2. The material for forming the walk-off crystals may be rutile (titanium dioxide-$TiO_2$) or yttrium vanadate ($YVO_4$). The preferred material is rutile, but other materials may be substituted. As is well known in the art, the thickness of a walk-off optical element is dictated by the desired spatial displacement of a polarization component having a particular alignment during propagation through the crystal. For each 1 mm of walk-off separation, a rutile crystal must have a thickness of approximately 10.0 mm. If the core-to-core distance of the first and third fibers 12 and 14 is 250 $\mu$m, the preferred walk-off distance may be $\sqrt{2}$ times one-half the center-to-center distance. Therefore, the thickness of the crystals 24 and 26 that form the first walk-off crystal pair would be selected to provide a walk-off distance of $\sqrt{2} \times 125$ $\mu$m=177 $\mu$m.

Between the first walk-off crystal pair and the Faraday rotator 22 is a second walk-off crystal pair comprised of crystals 36 and 38. The opposed walk-off directions of the crystals 36 and 38 are indicated by arrows 40 and 42 in FIG. 2 and by "+" and "−" signs in FIG. 1. The walk-off directions 40 and 42 of the second pair are perpendicular to the walk-off directions 28 and 30 of the first pair. In the top view of FIG. 1, the edge 44 of the crystal 38 is shown as being aligned with the axis 34 of the stack of optical elements that form the circulator 10.

At the rearward side of the Faraday rotator 22 are two walk-off crystals 46 and 48. The optical characteristics, the material properties, and the thickness of the crystal 46 are substantially identical to those of the crystal 26 of the first pair of crystals. It then follows that the optical characteristics, the material properties, and the thickness of the crystal 48 are substantially identical to those of the crystal 38 of the second pair.

With respect to light propagating through the circulator 10 in a forward direction toward the second fiber 18, the crystals 24, 26, 36 and 38 of the first and second walk-off crystal pairs manipulate light beams into separate polarization components. The Faraday rotator will rotate the polarization components in a direction that is dependent upon the applied magnetic field. The crystals 46 and 48 are used to selectively recombine the polarization components for output via the second fiber 18. For a rearwardly propagating light beam from the second fiber 18, the separate-and-recombine operations of the four walk-off crystals are reversed.

The walk-off crystals 24, 26, 36, 38, 46 and 48 provide an optical arrangement in which optical couplings among the three fibers 12, 14 and 18 are determined by the state of the Faraday rotator 22. If optical signals are simultaneously introduced via the first and third fibers 12 and 14, the second fiber 18 will receive the light beam from the first fiber when the Faraday rotator 22 is in a first state, but will receive the light beam from the third fiber when the Faraday rotator is in the second state. Alternatively, a light beam that is introduced via the second fiber 18 will be received at the third fiber 14 when the Faraday rotator is in the first state, but will be received at the first fiber 12 when the Faraday rotator is in the second state.

The ability to switch the optical couplings of the three fibers 12, 14 and 18 by switching the applied magnetic field of the Faraday rotator 22 may be used in either or both of a quality control application and a fiber-to-port alignment application. In the quality control application, the stack of optical elements is tested to ensure that the desired separate-and-recombine operations are properly performed. Often, batch processing is utilized to fabricate a large number of identical element stacks. For example, a batch may yield hundreds of the stacks of FIG. 1 prior to coupling the fibers 12,14 and 18 to the stacks. Walk-off crystals 24, 26, 36, 38, 46 and 48 may be mass produced and then assembled with the Faraday rotator 22 using known techniques. Selected element stacks within a manufacturing yield may be tested to verify performance. In this application, a light source is positioned at either the forward side 16 or the rearward side 20 of the stack to be tested. A light detector is positioned at the opposite side. The multi-state optical element, i.e. the Faraday rotator 22, is switched to determine whether there is optical coupling between the first and second ports in the first state and to determine whether there is optical coupling between the second and third ports in the second state. A "port" is defined herein as a location at which a fiber is to be coupled.

Figure 3:
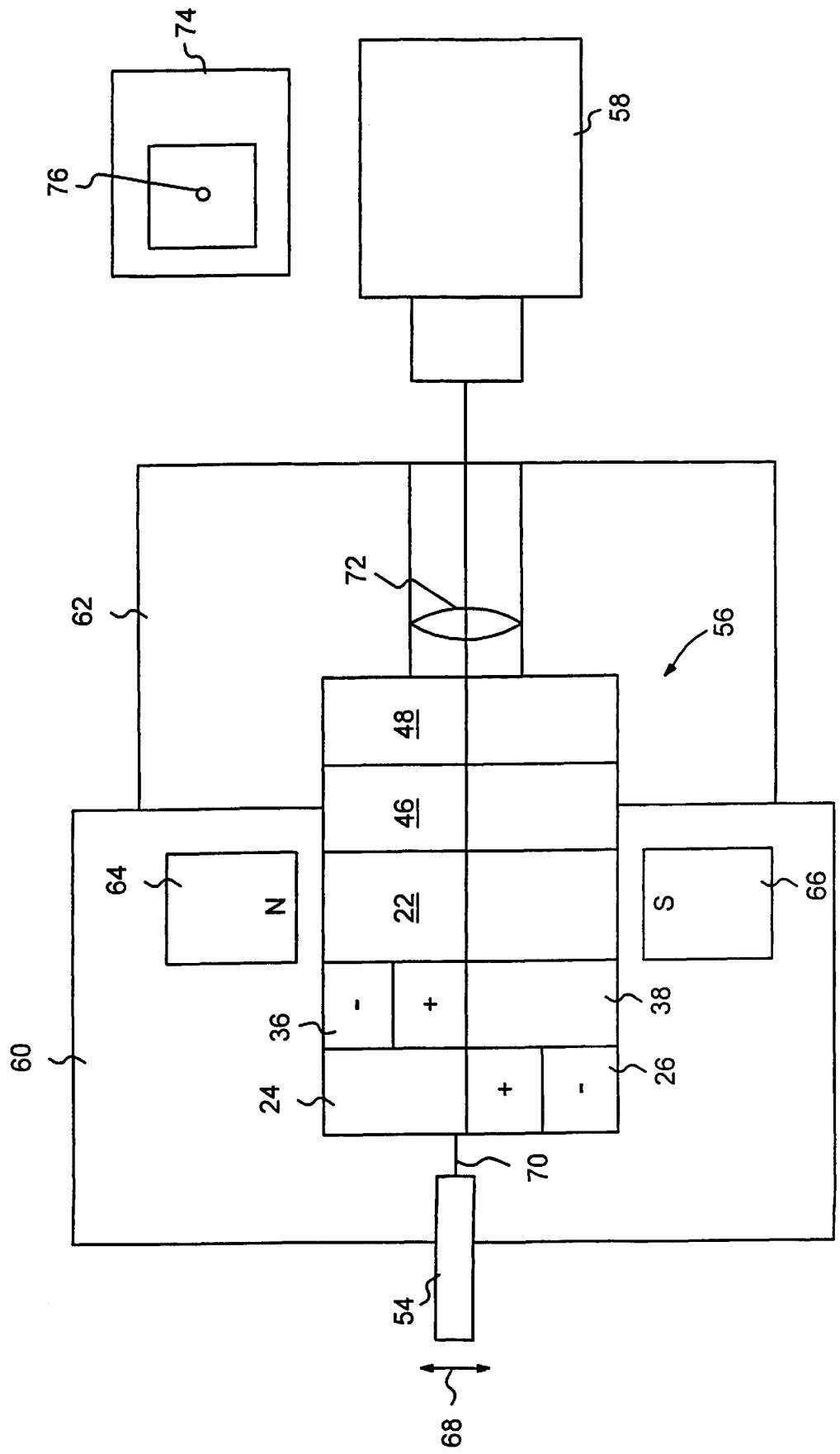
FIG. 3 is a top view of a video system for verifying performance of the optical device of FIG. 1.

FIG. 3 illustrates the embodiment in which the light source 54 is positioned at the forward side of the element stack 56, while the light detector 58 is at the rearward side. The element stack 56 is secured to a tool having a forward portion 60 and a rearward portion 62. Permanent magnets 64 and 66 set the state of the Faraday rotator 22. By reversing the positions of the permanent magnets, the Faraday rotator is switched between the two states described above. However, the switching may be achieved using other techniques, such as by selectively reversing the flow of electrical current through a coil that surrounds the Faraday rotator.

The light source 54 may be shifted between being in alignment with the first port of the element stack and being in alignment with the third port. Arrow 68 represents the ability of the light source to shift. In FIG. 3, the light source is positioned to direct a beam 70 to the first port of the element stack 56. When the crystals within the stack have the correct thicknesses and the Faraday 22 is in the first state, the light beam 70 that is introduced by the source 54 exits at the second port and is focused onto the light detector 58 by a lens 72. The light detector is a component of a video system that includes a monitor 74. The light detector may be a video camera or may be a microscope or other optical device suitable for observing an area of approximately 200 $\mu$m of the rearward surface of the element stack 56.

In operation, the light source 54 directs the beam 70, such as an infrared light beam, to the first port of the element stack 56. If the optical elements of the stack operate as intended, the beam exits at the second port, is detected by the light detector 58, and forms an image 76 on the monitor 74. The light source 54 is then moved to the third port, and the Faraday rotator 22 is switched to its second state, as by reversing the magnets 64 and 66. Without reversing the magnets, the light introduced at the third port would not reach the second port. However, the reversal of the polarity of the applied magnetic field changes the rotation of the polarization components of the beam, thereby placing the polarization components in conditions in which they will be recombined at the second port by the operations of the walk-off crystals 46 and 48.

In another embodiment of the quality control verification of the operations of separating and selectively recombining the polarization components, the light source 54 is positioned to direct an infrared beam into the second port of the element stack 56, and the light detector 58 has a field of view that includes both the first and third ports. With the Faraday rotator 22 in the first state, the beam will exit from the stack at the third port. Reversing the polarity of the applied magnetic field switches the Faraday rotator to the second state and causes the beam to exit at the first port. Thus, in this embodiment, the verification can occur without changing the position of either the light source 54 or the light detector 58.

If it is determined that the axes of recombined polarization components are not coincident with the axis of a port at which the components are to be output, the method may include a step of structurally changing the stack. That is, if in the embodiment of FIG. 3 the monitor 74 images two reduced-intensity light spots, it can be concluded that the recombination of polarization components has not occurred. Under such a condition, one or more of the walk-off crystal pairs may be replaced with a walk-off crystal pair having an increased or reduced thickness. The resulting change in thickness should be selected to cause the axes of the two polarization components to be aligned with each other and with the axis of the port from which the polarization components are intended to exit.

In some situations, the quality control testing may detect that the polarization components are properly recombined, but at a location other than the intended position of the port. For example, it may be determined that the center-to-center distance between the first and third ports is 260 μm, rather than the intended 250 μm. As an alternative to providing correction by changing thicknesses of the optical elements within the element stack, the positions of the optical fibers that are to be coupled to the stack may be adjusted. Thus, if a manufacturing batch of 500 stacks is determined to have center-to-center distances of 260 μm between the first and third ports, a corresponding batch of 500 fiber-seating assemblies may be fabricated to define fiber-to-fiber spacings of 260 μm.

The fiber-seating assembly positions the first and third fibers 12 and 14 of FIG. 1 in a fixed parallel relationship with a preselected center-to-center spacing. A preferred embodiment of precisely aligning either TEC fibers or fixed-diameter fibers will be explained with reference to FIGS. 4 and 5. A semiconductor substrate, such as a silicon wafer 78, is etched to form V-shaped grooves 80 and 82. Conventional integrated circuit fabrication techniques may be utilized. For example, the grooves may be formed photo-lithographically, using a mask to define the grooves and using a chemical etchant. While not critical, the angle of one wall of a groove relative to the other wall is preferably 70.5°. The protective coating that surrounds the optical fibers 12 and 14 may be removed in order to allow the fibers to be more closely spaced. The fiber cores without the coating material are then placed within the grooves. The use of silicon processing techniques enables the precise center-to-center spacing of the fiber cores. Tolerances of less than 1 micron are achieved. Thus, the pitch of the cores may be fabricated to precisely match the pitch of the ports within the stack of optical elements that comprise the optical device to which the fibers are to be aligned.

In FIG. 5, a second silicon wafer 84 having a corresponding array of V-shaped grooves is fixed to the lower silicon wafer 78 by a layer of adhesive 86. The use of an adhesive layer is not critical. Alternatively, wafer bonding may be used to attach the two silicon wafers. Silicon V-groove alignment of single-mode fibers and multi-mode fibers is known in the art.

Returning to FIG. 1, the second optical fiber 18 may also be fixed in position using a pair of silicon wafers 88 having V-shaped grooves. The benefits of using this side-by-side fiber alignment process are increased with the number of fibers and ports at the forward side 16 and/or the rearward side 20 of the element stack.

An advantage of the silicon micromachining to provide sub-micron tolerances in the alignment of side-by-side fibers is that all of the fibers are brought into registration during a single alignment step to the element stack. In FIG. 1, if a conventional alignment procedure is used to optically couple the first fiber 12 to the second fiber 18, the third fiber 14 will automatically be brought into alignment with the second fiber, if the pitch of the ports matches the pitch of the fibers and if the axes of the first and third fibers are along the same horizontal plane, as viewed from the orientation of FIG. 1. The horizontal registration can be assured by providing an alignment tool in which the stack of optical elements of FIG. 1 and the silicon wafer 78 of FIG. 5 are supported such that the optical axes of the first and third fibers 12 and 14 and the optical axes of the first and third ports are along the same horizontal plane.

Figure 6:
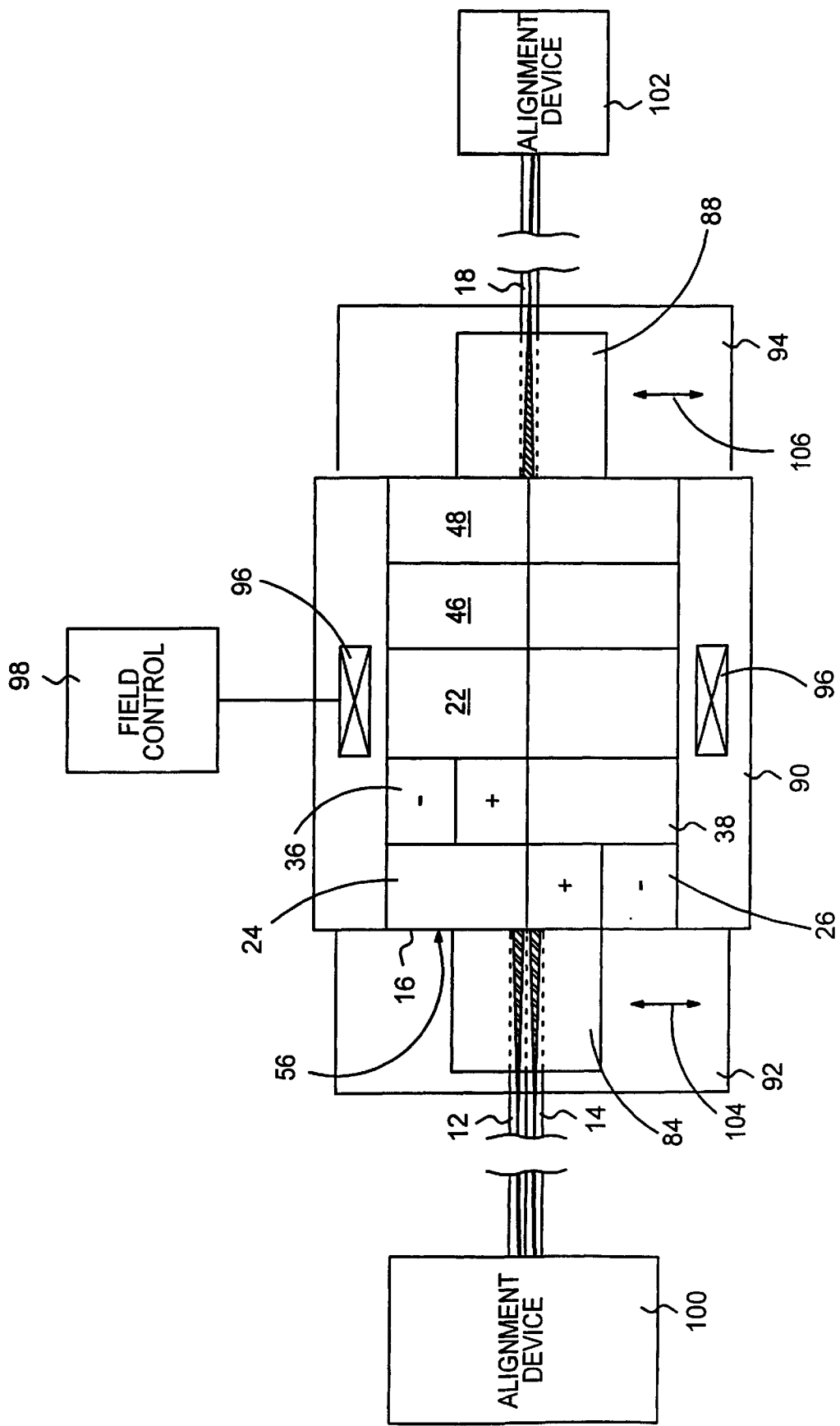
FIG. 6 is a top view of an alignment system having a jig and a video system for optically coupling the fibers of FIG. 1.

An alignment system is shown in FIG. 6. The system includes a jig having a stationary central portion 90 and laterally displaceable end portions 92 and 94. FIG. 6 is a top view of the system. Vertical positioning of the stack 56 of optical elements is fixed by the structures of the central and end portions 90, 92 and 94. For example, the upper surfaces of the end portions may be precisely planarized to ensure that the fibers 12, 14 and 18 are at known fixed positions along the vertical. In like manner, the central portion 90 may have planarized surfaces that match the surfaces of the element stack 56, so that the input/output ports of the stack are fixed with respect to the vertical.

The central portion 90 of the jig includes an annular electrical coil 96 that surrounds the Faraday rotator 22. Current flow through the coil is determined by a field controller 98. By determining the direction of current flow, the field controller dictates the state of the Faraday rotator.

The first and third optical fibers 12 and 14 are connected to a first alignment device 100, while the second fiber 18 is connected to a second alignment device 102. If the alignment procedure is selected to be one in which infrared light is transmitted from the first optical fiber 12 to the second optical fiber 18, the first alignment device may merely be a light source, while the second alignment device may be a camera system with a monitor. Alternatively, the light may be transmitted from the second alignment device to the first alignment device, so that the positions of the light source and camera system would be reversed. As a third alternative, light may be transmitted and received at both of the alignment devices 100 and 102, requiring light sources and camera systems at both ends.

Because the vertical positions of the first and third fibers 12 and 14 are fixed and the spacing between the first and third fibers is known and is equal to the spacing between the first and third ports of the element stack 56, only one alignment step is required. That is, by optically coupling the first fiber 12 to the second fiber 18, the second fiber and third fiber 14 are optically coupled. Light may be directed into the first fiber 12 by the first alignment device 100 for output from the stack 56 via the second fiber 18. The camera system of the second optical device detects and images the output of the second fiber 18. Either or both of the end portions 92 and 94 of the jig may be laterally manipulated, as indicated by arrows 104 and 106, until an efficient optical coupling is established between the first and second fibers. The magnetic field applied to the Faraday rotator 22 then may be switched to ensure that the input signal from the first fiber is isolated from the second fiber when the Faraday rotator is in the second state. Optionally, the first alignment device 100 may direct an input signal into the third fiber 14 to determine that the signal is received at the second alignment device 102 when the Faraday rotator is in the second state. This optional step is recommended if the quality control process described above has not been utilized for a particular manufacturing batch.

In the applications in which light is transmitted from the second alignment device 102 to the first alignment device 100, the first alignment device should detect an efficient optical coupling between the second and third fibers 18 and 14 when the applied magnetic field to the Faraday rotator 22 places the Faraday rotator in the first state. On the other hand, an efficient optical coupling from the second fiber 18 to the first fiber 12 should be detected when the Faraday rotator is in the second state.

For instances in which the optical coupling cannot be achieved, the corrective measures described above may be utilized. That is, the thickness of one or more of the optical elements of the stack 56 may be changed or the fiber-seating assembly that determines the spacing between the first and third fibers 12 and 14 may be substituted for a fiber-seating assembly that has a different fiber-to-fiber spacing. This second corrective measure may be utilized when the actual center-to-center distance between the first and third ports of the stack 56 is greater than the anticipated distance. It is likely that the difference between the actual distance and the anticipated distance will apply to all of the stacks of a manufacturing batch.

The separation-and-recombination operations of polarization components propagating through the stack of optical elements has been identified, but has not been fully explained. A more thorough explanation is illustrated beginning with FIGS. 7 and 8. FIG. 8 illustrates light beams entering the first pair 108 of walk-off crystals 24 and 26. The light beam from the first fiber 12 is introduced into the walk-off crystal 24 at a first port 110, while the light beam from the third fiber 14 is introduced into the walk-off crystal 26 at a third port 112. The light beam at the first port is comprised of first and second polarization components 114 and 116, and the light beam at the third port is comprised of third and fourth polarization components 118 and 120. In order to more clearly distinguish the beam components, the third and fourth polarization components are shown as thicker lines than the components of the first beam. Moreover, the first and fourth components are shown as being longer lines than the lines that represent the second and third components.

Figure 9:
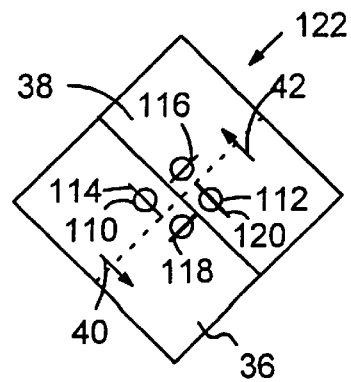

As the polarization components 114–120 propagate through the first pair 108 of walk-off crystals, the second polarization component 116 is spatially displaced in the direction indicated by 28 and the third polarization component 118 is spatially displaced as indicated by arrow 30. When the polarization components reach the forward face of the second pair 122 of walk-off crystals, the components are isolated from each other, as shown in FIG. 9. During propagation through the second pair 122, the fourth polarization component 120 is spatially displaced in the direction of arrow 42 and the first polarization 114 is spatially displaced in the direction of arrow 40. However, the second and third polarization components 116 and 118 propagate through the walk-off crystals 36 and 38 without deviation. As a result, the polarization components reach the forward face of the Faraday rotator 22 in the positions shown in FIG. 10.

Figure 10:
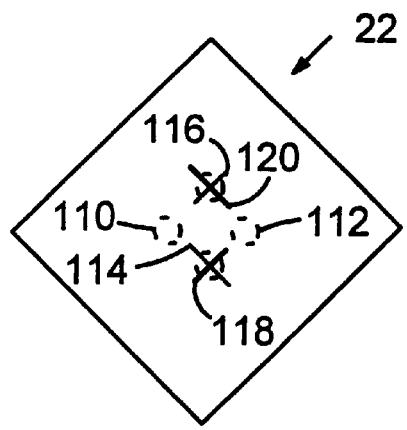
Figure 11:
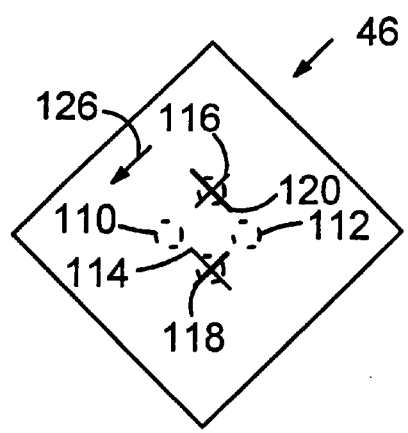

In a first rotation-determining state, the Faraday rotator 22 of FIG. 10 induces no rotation of the four polarization components 114–120. That is, the Faraday rotator rotates the angle of polarization of propagating light through 0°. Thus, as shown by comparing FIGS. 10 and 11, the four components reach the forward face of walk-off crystal 46 in the same positions and rotational conditions as when the components entered the Faraday rotator 22.

Figure 12:
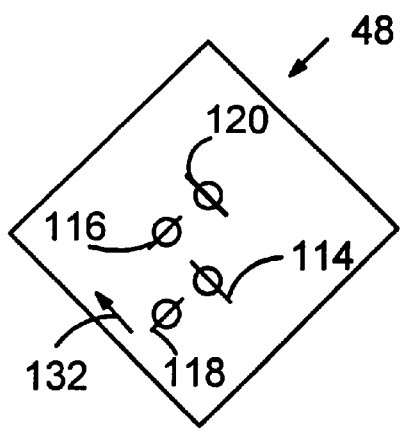

Arrow 126 indicates the walk-off direction of the walk-off crystal 46. The orientations of the second and third polarization components 116 and 118 are aligned with the arrow 126, so that the second and third polarization components are spatially displaced during propagation of the light beams through the walk-off crystal 46. The positions of the four polarization components at the forward face of the walk-off crystal 48 are shown in FIG. 12. Arrow 132 indicates the walk-off direction of the walk-off crystal 48. The first and fourth polarization components 114 and 120 are aligned with the walk-off direction 132, so that the first and second components 114 and 116 again overlap at the exit of the stack 56 of optical elements.

Figure 7:
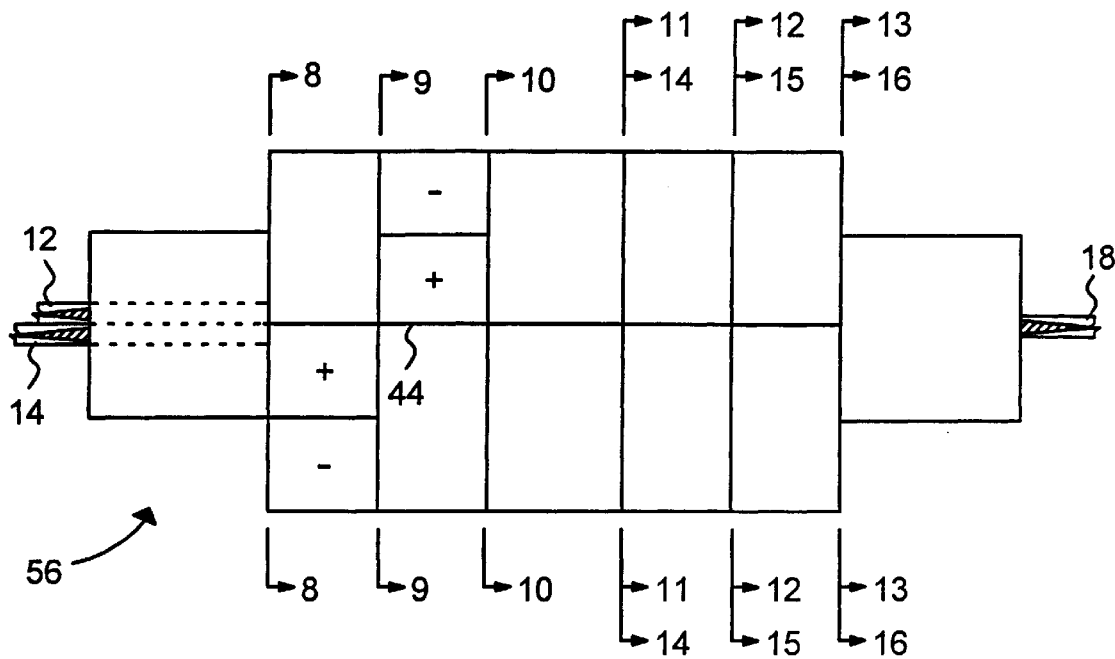
FIG. 7 is a top view of the optical device of FIG. 1 having indications of the perspectives of cross sectional views of FIGS. 8–16.
Figure 8:
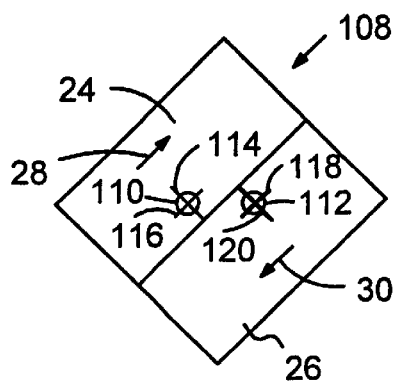
FIGS. 8–13 are cross sectional views of FIG. 7 having representations of polarization components when the Faraday rotator of FIG. 10 is in a first state.
Figure 13:
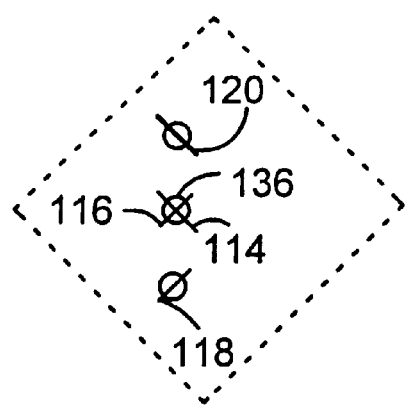

Referring to FIG. 13, the first and second polarization components 114 and 116 are shown as overlapping with the second port 136 that is coaxial with the second fiber 18 of FIG. 7. Consequently, the input beam from the first fiber 12 is output via the second fiber 18 when the Faraday rotator 22 is in the first state. However, the third and fourth polarization components 118 and 120 are isolated, so that there will be no crosstalk among fibers 12, 14 and 18.

Returning to FIG. 10, if the magnetic field that is applied to the Faraday rotator 22 is reversed in polarity, the angles of polarization will rotate 90° during propagation through the Faraday rotator. The polarization components will still be in the positions and rotational conditions shown in FIG. 10, but the four components 114–120 will rotate relative to the orientations previously described with reference to FIG. 11. That is, rather than the rotational conditions shown in FIG. 11, the polarization components will be in the orientations shown in FIG. 14 when the light reaches the forward face of walk-off crystal 46.

Figure 14:
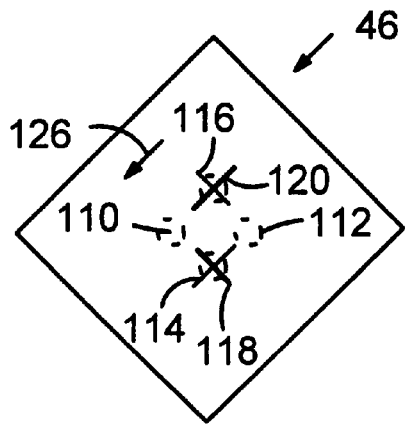
FIGS. 14–16 are cross sectional views of FIG. 7 having representations of polarization components when the Faraday rotator of FIG. 10 is in a second state.

Still referring to FIG. 14, the fourth polarization component 120 is now in alignment with the walk-off direction of arrow 126. As a result, the fourth polarization component 120 will be spatially displaced in the direction of arrow 126 during propagation through the walk-off crystal 46. The first polarization component 114 also will be spatially displaced in the direction of arrow 126 during propagation through the crystal 48. Upon reaching the forward face of the walk-off crystal 48, the four polarization components will be in the positions shown in FIG. 15.

Figure 15:
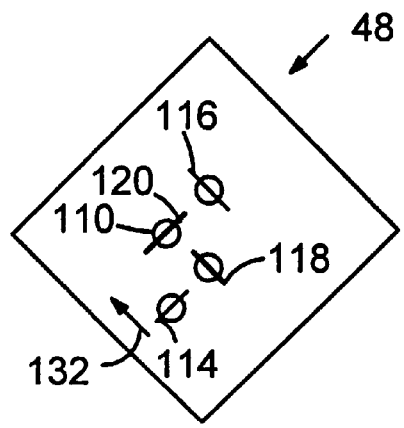

In FIG. 15, it can be seen that the second and third polarization components 116 and 118 are aligned with the walk-off direction 132 of crystal 48. Therefore, the third polarization component 118 is spatially displaced to overlap the fourth polarization component 120, and the second polarization component 116 is spatially displaced to a position in isolation from the first polarization component 114. At the exit of the stack 56 of optical elements of FIG. 7, the third and fourth polarization components will be positioned to exit via the second fiber 18.

Figure 16:
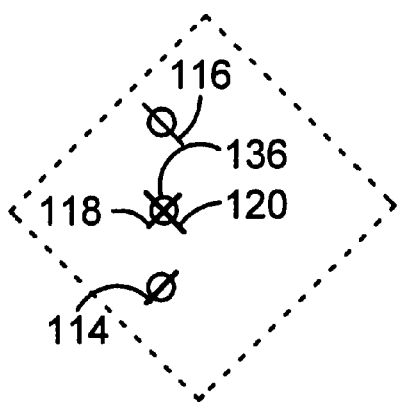

Referring to FIG. 16, the third and fourth polarization components, which originated from the third fiber, are aligned with the second port 136, while the first and second polarization components are isolated. Comparing FIGS. 13 and 16, by switching the state of the Faraday rotator, the optical coupling among fibers is switched from a first-to-second optical coupling of fibers to a third-to-second optical coupling. In comparison, if the input signal is received from the second fiber 18 of FIG. 7, the switching of the state of the Faraday rotator will switch the coupling between an output via the third fiber 14 and an output via the first fiber 12.

Optionally, the optical device 10 of FIG. 1 may have more than two fibers at the forward side 16 and/or more than one fiber at the rearward side 20. If the pitch of the fibers is fixed, such as by using the techniques described with reference to FIGS. 4 and 5, the procedures described above may be used to eliminate at least one alignment step. For example, the rearward side 20 may include two ports that are aligned with two fibers. Switching the state of the Faraday rotator 22 would then switch the optical connections between forward and rearward fibers.

FIG. 17 is a top view of another optical device 142 that accommodates the above-described alignment procedure. That is, the optical device has an optical arrangement that switches the optical coupling among fibers based upon the state of at least one switchable multi-state optical element. In the embodiment of FIG. 17, there are two multi-state elements 138 and 140. In the preferred embodiment, the multi-state elements are Faraday rotators.

A side view of the optical device 142 of FIG. 17 is shown in FIG. 18. The optical device includes first and third fibers 144 and 146 that are fixed at a particular pitch by a fiber-seating assembly 148. The fiber-seating assembly may be identical to the one described with reference to FIGS. 4 and 5. At the rearward side 150 of a stack of optical elements is a third port 152. Light that exits from the third port is focused onto a second fiber 154 by a converging lens 156. Although a conventional bi-convex lens may be used as the lens 156, a cylindrical gradient index (GRIN) lens is preferred, since a GRIN lens is easier to mount relative to the stack of optical elements illustrated in FIGS. 17 and 18.

From the forward side 158 of the stack of optical elements, the first optical element is a walk-off crystal 160 having a walk-off direction 162. The next optical element is a pair of side-by-side half-wave plates 164 and 166. Each half-wave plate rotates polarization components by 45°. The rotations of the two half-wave plates are oppositely directed, as represented by lines 168 and 170 in FIG. 18. The first Faraday rotator 138 also induces a 45° rotation. However, with respect to polarization components from one of the two half-wave plates, the rotation by the Faraday rotator will "neutralize" the total rotation, while polarization components propagating from the other half-wave plate will be induced to continue to rotate in the same direction. That is, the cumulative rotations of polarization components will be 0° and 90°, depending upon the path of the polarization components. In FIGS. 17 and 18, the Faraday rotator 138 induces clockwise rotation, so that the counterclockwise rotation of the half-wave plate 166 is "neutralized." On the other hand, the 45° clockwise rotation of the half-wave plate 164 is doubled by operation of the Faraday rotator 138. If the applied magnetic field to the Faraday rotator 138 is reversed, the rotation of the half-wave plate 164 is offset, while the rotation of the half-wave plate 166 is doubled.

Between the two Faraday rotators 138 and 140 is a second walk-off crystal 172 having a walk-off direction 174. On the rearward side of the second Faraday rotator 140 is another pair of half-wave plates 176 and 178 having opposed 45° rotations, as represented by lines 180 and 182. The cumulative effects of the Faraday rotator 140 and the two half-wave plates 176 and 178 are similar to that described with reference to the first Faraday rotator 138 and the half-wave plates 164 and 166. If the second Faraday rotator 140 induces clockwise rotation of forwardly propagating polarization components, the polarization components that pass through the half-wave plate 176 will be rotated a total of 90°. On the other hand, the clockwise rotation of the polarization components will be offset for polarization components passing through the other half-wave plate 178. Switching the second Faraday rotator 140 from its first state to its second state reverses the cumulative effects of the second Faraday rotator and the half-wave plates 176 and 178.

The final optical element is a third walk-off crystal 184 having a walk-off direction 186. The operation of the optical device 142 will be readily understood by persons skilled in the art. When the first and second Faraday rotators are in first states, each Faraday rotator will induce a clockwise 45° rotation of polarization components. As a result, input signals from the first optical fiber 144 will be optically coupled to the second fiber 154, and any input signals from the second fiber 154 will be output via the third fiber 146. However, the optical couplings will be reversed when the two Faraday rotators 138 and 140 are switched to their second states, inducing counterclockwise rotation.

In the assembly of the optical device 142, the first fiber 144 may be aligned with the second fiber 154 when the two Faraday rotators 138 and 140 are in their first states. Because the center-to-center distances between the first and third fibers 144 and 146 is fixed, the third fiber is automatically brought into registration with the third port of the stack of optical elements. This provides a significant reduction in the cost of assembling the optical device 142.

What is claimed is:

1. A method of assembling an optical device for selectively coupling optical signals among a unidirectional input port, a unidirectional output port and a bidirectional port comprising steps of:

securing input and output optical fibers in a fixed generally parallel relationship;

forming a stack of polarization-manipulating elements such that said stack includes input and output ports on a forward side of said stack and a bidirectional port on a rearward side opposite to said forward side, including positioning a controllable multi-state element within said stack such that an input beam from said input port is optically coupled to said bidirectional port when said controllable multi-state element is in a first state and such that an input beam from said output port is optically coupled to said bidirectional port when said multi-state controllable element is in a second state;

directing light from said forward side of said stack toward said rearward side and selectively switching said controllable multi-state element to detect whether said bidirectional port is optically coupled to said input port and optically isolated from said output port when said controllable multi-state element is in said first state and to detect whether said bidirectional port is optically isolated from said input port and optically coupled to said output port when said controllable multi-state element is in said second state; and upon detecting that said selective optical couplings from said input and output ports to said bidirectional port exist, optically aligning a bidirectional optical fiber on said rearward side of said stack with a selected one of said input and output optical fibers on said forward side, wherein said step of directing said light and said step of optically aligning said bidirectional optical fiber are achieved without directing light from said stack to said input and output ports.

2. The method of claim 1 wherein said step of securing said input and output optical fibers includes photolithographically forming parallel grooves in a substrate and seating said input and output optical fibers in said grooves.

3. The method of claim 1 wherein said step that includes positioning said at least one controllable multi-state element comprises disposing a Faraday rotator between forward and rearward polarization-manipulating elements that include walk-off crystals.

4. The method of claim 3 wherein said step that includes selectively switching said controllable multi-state element includes shifting an applied magnetic field such that rotations of polarization components of propagating beams are changed.

5. The method of claim 4 wherein said step that includes shifting said applied magnetic field comprises reversing an electrical current through a coil that is external to said Faraday rotator.

6. The method of claim 4 wherein said step that includes shifting said applied magnetic field comprises mechanically adjusting an orientation of a permanent magnet relative to said Faraday rotator.

7. The method of claim 1 wherein said step of optically aligning said bidirectional fiber includes actively positioning said input fiber relative to said bidirectional fiber by detecting the propagation of a light beam between said input and bidirectional fibers, said bidirectional optical fiber thereby being optically aligned with said output fiber without propagating light between said bidirectional and output fibers.

8. The method of claim 1 wherein said step of forming said stack comprises arranging said polarization-manipulating elements to form an optical circulator.

9. A method of optically coupling a first fiber to a second fiber and optically coupling said second fiber to a third fiber comprising steps of:

forming an array of side-by-side optical elements such that polarization components of beams propagating through said array are separated and then selectively recombined, including arranging a plurality of walk-off crystals and a Faraday rotator within said array such that said selective recombination of polarization components is dependent upon a state of a magnetic field applied to said Faraday rotator;

switching said applied magnetic field between first and second states, thereby shifting said Faraday rotator between first and second polarization rotation conditions for rotating polarization components propagating through said Faraday rotator, said switching comprising reversing a polarity of said applied magnetic field;

identifying relative positions of first, second and third ports on said array based upon said recombinations of said polarization components, wherein polarization components of a first beam that is introduced into said array at said first port are separated and then recombined at said second port when said applied magnetic field is in said first state and wherein polarization components of a second beam that is introduced into said array at said third port are separated and then recombined at said second port when said applied magnetic field is in said second state; and aligning said first, second and third fibers to said first, second and third ports, respectively.

10. The method of claim 9 wherein said step of aligning said fibers to said ports includes fixing said first and third fibers to a substrate at a known center-to-center distance that is equal to a center-to-center distance between said first and third ports on a forward surface of said array, said step of aligning further including detecting a condition in which a beam introduced into said array at said first port exits said array to said second fiber at said second port, said third fiber thereby being optically aligned with said third port and with said second fiber in the absence of an alignment step of propagating a beam between said second and third fibers.

11. The method of claim 9 wherein said step of switching said applied magnetic field includes changing an orientation of a permanent magnet by 180° relative to said Faraday rotator.

12. The method of claim 9 wherein said step of switching said applied magnetic field includes reversing the direction of current conducted through a coil external to said Faraday rotator.

13. A method of ascertaining proper operation of an optical assembly having selective coupling among first, second and third input/output ports comprising steps of:

forming a stack of polarization-manipulating optical elements such that first and third ports are on a forward side and a second port is on a rearward side of said stack, said optical elements including a plurality of polarization walk-off elements and at least one polarization rotation element that is responsive to application of a magnetic field;

positioning a light source at one of said forward and rearward sides of said stack and a light detector at the other of said forward and rearward sides such that propagation of light between said second port and said first and third ports is detectable;

manipulating a magnetic field applied to at least one of said polarization rotation elements to switch between first and second states that are distinguishable with respect to rotating polarization components of beams;

detecting whether said first state induces optical coupling between said first and second ports and optical isolation between said second and third ports; and detecting whether said second state induces optical coupling between said second and third ports and optical isolation between said first and second ports.

14. The method of claim 13 further comprising a step of adjusting a thickness of at least one of said polarization-manipulating optical elements in response to a negative determination during one of said steps of detecting optical coupling and optical isolation for said first and second states.

15. The method of claim 14 further comprising a step of adjusting a perceived location of at least one of said first, second and third ports in response to a negative determination during one of said steps of detecting optical coupling and optical isolation for said first and second states.

16. The method of claim 14 further comprising a step of aligning first, second and third optical fibers to said first, second and third ports, respectively, in response to positive determinations during said steps of detecting optical couplings and optical isolations for said first and second states.

17. The method of claim 16 wherein said step of aligning said first, second and third optical fibers includes fixing said first and third fibers to a substrate at a pitch equal to a pitch of said first and third ports and includes propagating light from said first fiber to said second fiber.

* * * * *